June 8, 1965  A. G. CLARKE, JR  3,188,608
VEHICLE COMBINATION TURN AND DECELERATION INDICATOR
Filed Nov. 21, 1962
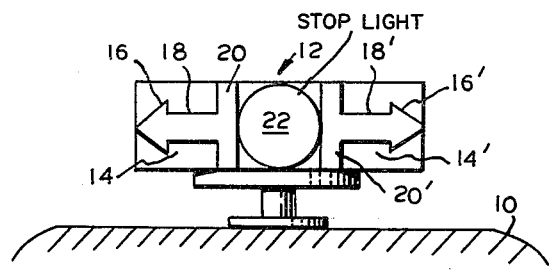
FIG. 1
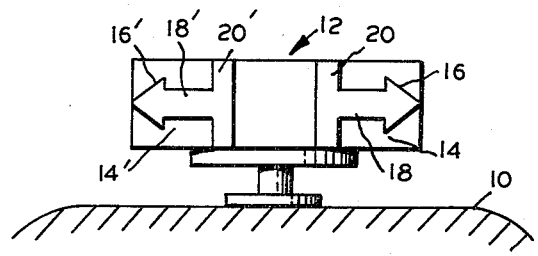
FIG. 2
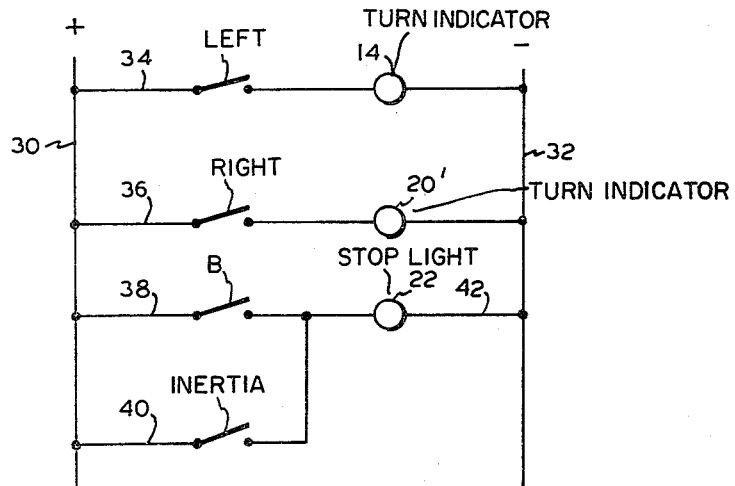
FIG. 3
INVENTOR.
ADNA G. CLARKE, JR.
BY
ATTORNEY

3,188,608
VEHICLE COMBINATION TURN AND DECELERATION INDICATOR
Adna G. Clarke, Jr., 2131 Armstrong St., Honolulu 14, Hawaii
Filed Nov. 21, 1962, Ser. No. 239,147
1 Claim. (Cl. 340—74)

This invention is an improvement in stop and turn indicators for automobiles, adapted especially for the modern expressway, highway, freeway or turnpike driving.

It is a further object of this invention to provide an indicator as aforesaid which will be operative at the will of the driver, and, so far as "stop" indication is concerned, upon any deceleration of the car.

It is a further object of this invention to provide an indicator as aforesaid which, within limited dimensional confines, nevertheless will provide accurate and visible indications to a following driver, even at considerable distance and at high road speeds.

The above and other objects will be made clear from the following detailed description, taken in connection with the annexed drawings in which:

FIGURE 1 is an elevation taken from behind a forwardly moving vehicle of the indicator of this invention;

FIGURE 2 is a view similar to FIGURE 1 but taken from *ahead* of said vehicle; and FIGURE 3 is a schematic, preferred wiring diagram for the indicator of this invention.

The modern type of high speed throughway, freeway, turnpike or what you will, has accentuated, quite gravely, a problem already existent in the most dense and slowest midcity traffic. In the words of traffic experts, here summarized, "It is not enough to know what the car ahead of you is about to do; you must know what the car four or five cars ahead is about to do." At modern highway speeds, legally 60–70 miles per hour, the problem is multiplied more or less by geometric progression, that is, speed, per se increases the safe distance between preceding and following cars. Traffic experts seem generally to be in accord that a car length for each 10 m.p.h. of road speed is essential to safe driving. Quite obviously this does not occur in bumper to bumper driving, as is the case in the Los Angeles freeways. However, on such highways as the New York Freeway; the New Jersey Turnpike; the Pennsylvania Turnpike and those of Ohio, Indiana and Illinois, the noted rule of one car length for each 10 m.p.h. of road speed puts the fourth or fifth car ahead at a *desired* distance of from 500 to 600 feet. Actually, under present turnpike conditions, the driver must diagnose the traffic at least one mile ahead, that is, at 60 m.p.h. which is 88 feet/second, the driver must be aware of conditions one mile ahead in order to avoid the chain reaction type of collision with which we are all too familiar on present day freeways.

The instant invention insures that a following driver will ascertain the intentions of a preceding driver at least one mile ahead of the following driver.

Referring now to FIGURES 1 and 2 there is shown, mounted on the roof 10 of a vehicle, an indicator generally designated by the numeral 12. It is of the utmost importance that the following driver be enabled to diagnose the intentions of a preceding driver at least one mile ahead. At such distance, the altogether and quite familiar, laws of optics apply. The familiar subtended angle of vision governs the situation and at a range of one mile or more the angle becomes narrow indeed. In darkness the problem becomes acute, since, at the range contemplated, (one mile) *any light* is a mere pinpoint. An object of this invention is to convert this "pinpoint" into a diagnosable signal.

This is accomplished by making the signal 12 of FIGURE 1 with a left turn indicator 14 which includes not only an arrow point 16 and a shaft 18 but a broad base 20. FIGURE 2 is the same, with the stop light 22 eliminated since this would not advise oncoming drivers of anything. Even as a pinpoint of light the broad base 20 of FIGURES 1 and 2 and the equivalent right hand broad base 20' will serve to distinguish right from left indications.

A stop light is shown at 22 in FIGURE 1. As part of this invention, this stop light 22 is controlled, in parallel by a circuit which includes the conventional brake switch and also an inertially operated switch activated by deceleration upon mere lifting of one's foot from the accelerator. All of this is shown in FIGURE 3.

Referring now to FIGURE 3, there are shown a positive line 30 and a negative line 32. A left turn line 34 contains a switch L which completes a circuit through the indicator 14. A right turn line 36 contains a switch R which completes a circuit through the indicator 20'. Conventional blinker switches may be inserted in both circuits.

The stop light 22 may be activated either by a brake operated switch B in line 38 or by an inertia operated switch I in line 40. The switch I is conventional and operates upon deceleration of the vehicle even in the absence of pressure on the brake pedal. If desired a blinker switch may be installed in line 42.

The essence of the present invention lies in the roof-top mounting of the turn and stop (or deceleration) indicators and in making discernable and distinguishable, at a distance, the respective signals for right and left turns.

I claim:

A combination turn and deceleration indicator for motor vehicles especially for use on high speed, long visibility highways, said combination comprising: a fixture of a width substantially approximating the width of a vehicle roof and of substantial height relative to its width; means for mounting said fixture on a vehicle roof to project above said roof; an illuminatable deceleration indicator located substantially centrally of said fixture; means in said fixture for illuminating said indicator; left and right turn indicators on opposite sides of said deceleration indicator; said right and left turn indicators illuminatable areas extending to approximately the outer extremities of said fixture and being of substantially less height than said fixture, each of said turn indicators having adjacent said deceleration indicator, a vertically extending illuminatable area of substantial width and of a height approximating the height of said fixture; means under the control of the vehicle operator for selectively illuminating either of said turn indicators, and parallel circuits for illuminating said deceleration indicator, one of said parallel circuits containing a brake operated switch and the other containing an inertially operated switch responsive to any deceleration of the vehicle.

References Cited by the Examiner
UNITED STATES PATENTS

| | | | |
|---|---|---|---|
| 1,675,070 | 6/28 | Van Ness et al. | 340—67 |
| 1,952,133 | 3/34 | Kovacs | 340—66 |
| 2,134,313 | 10/38 | Nordgran | 340—74 |
| 2,676,311 | 4/54 | Palazzolo | 340—74 |

NEIL C. READ, *Primary Examiner.*